United States Patent [19]
Nakagawa

[11] Patent Number: 5,120,091
[45] Date of Patent: Jun. 9, 1992

[54] OIL IMPREGNATED SINTERED BEARING

[75] Inventor: Hisaya Nakagawa, Komagane, Japan

[73] Assignee: Sankyo Seiki Mfg. Co., Ltd., Nagano, Japan

[21] Appl. No.: 584,158

[22] Filed: Sep. 18, 1990

[30] Foreign Application Priority Data

Sep. 20, 1989 [JP] Japan ................. 1-242292

[51] Int. Cl.⁵ ............... F16C 33/02; B21D 53/10
[52] U.S. Cl. ...................... 384/279; 384/902; 29/898.054
[58] Field of Search ............. 384/279, 902, 100, 114, 384/118, 322, 397; 29/898.054, 898.057

[56] References Cited

U.S. PATENT DOCUMENTS

| | | | |
|---|---|---|---|
| 2,855,249 | 10/1958 | Gérard | 384/279 |
| 2,894,792 | 7/1959 | Brilli | 384/279 |
| 3,110,085 | 11/1963 | Sternlicht | 384/279 X |
| 3,276,676 | 10/1966 | Buske | 384/100 X |
| 4,290,655 | 9/1981 | Apuzzo et al. | 384/902 X |
| 4,747,705 | 5/1988 | Agrawal | 384/118 |

FOREIGN PATENT DOCUMENTS

| | | | |
|---|---|---|---|
| 60-230905 | 11/1985 | Japan . | |
| 106122 | 5/1987 | Japan | 384/322 |
| 167922 | 7/1987 | Japan | 384/322 |

Primary Examiner—Thomas R. Hannon
Attorney, Agent, or Firm—McAulay Fisher Nissen Goldberg & Kiel

[57] ABSTRACT

An oil impregnated sintered bearing suitably used for a spindle motor, which rotatably supports a shaft in a longitudinal opening of the bearing for supporting the motor shaft. The longitudinal opening is formed by at least three inwardly projecting surfaces defining a portion of the longitudinal opening and being arranged symmetrically with respect to a central longitudinal axis of the opening. The surfaces are almost tangential to a motor shaft disposed in the opening such that the surfaces have a clearance relative to the shaft which is smaller than that of other inner peripheral portions defining the opening. A wedge-like clearance is formed between the shaft and a side of the projecting surfaces toward which the shaft rotates.

3 Claims, 2 Drawing Sheets

OIL IMPREGNATED SINTERED BEARING

BACKGROUND OF THE INVENTION

1. Field of the Invention

The present invention relates to a bearing, and more specifically, to an oil impregnated sintered bearing which is suitable for use as a bearing of a motor without side pressure such as a spindle motor.

2. Background Prior Art

A spindle motor is used as a rotation and drive source in a compact disk player, a video disk player, a floppy disk drive device and the like. Such spindle motor merely rotates and receives no side pressure. In the case where a slide bearing is used for such a motor as described, a vibration occurs during rotation due to play between the motor shaft and the bearing.

In view of the above, the following measures have been heretofore taken for the bearing of a motor which receives no side pressure such as a spindle motor in order to minimize the vibration of the shaft:

1. Clearance between the bearing and the shaft is reduced by about 15 $\mu$m to 2-3 $\mu$m of normal clearance;
2. A magnet or the like, for example, is mounted on a stator to attract a rotor in order to apply a side pressure load;
3. A dynamic pressure bearing such as a groove bearing is used.

In the above described method (1), however, the vibration becomes small but a non-periodic vibration occurs. It is also very difficult, in terms of precision, to machine parts with accuracy of 2 to 3 $\mu$m.

In the construction mentioned in (2) above, such construction for applying side pressure becomes complicated.

In the case of the method (3), such approach is effective for reducing vibrations. However, since a groove is normally formed by etching, such bearing is expensive when compared with ordinary bearings. Moreover, this approach involves a supply of oil and a seal in its construction. When oil supply is short, a dynamic pressure effect cannot be obtained, resulting in occurrence of burn. In addition, since the groove for obtaining the dynamic pressure effect is a special one, an extremely precise machining technique is required.

SUMMARY OF THE INVENTION

It is an object of the present invention to provide a dynamic pressure bearing which can be produced at less cost by the simple step of using an oil impregnated sintered bearing, that is, by providing an oil impregnated sintered bearing having the function of a dynamic pressure bearing.

For achieving the aforesaid object, the present invention provides an oil impregnated sintered bearing for rotatably supporting a cylindrical shaft in a longitudinal opening of the bearing hole and comprises at least three inwardly projecting surfaces defining a portion of the longitudinal opening and being arranged symmetrically with respect to a central longitudinal axis of the opening. The surfaces are almost tangential to a shaft disposed in the longitudinal opening such that the surfaces have a clearance relative to the shaft which is smaller than that of other inner peripheral portions defining the opening. A wedge-like clearance is formed between the shaft and a side of the projecting surfaces toward which the shaft rotates (i.e., the inlet side).

As the shaft rotates, oil supplied from pores of the bearing is gathered at the projecting surfaces, oil pressure is generated in the wedge-like clearance between the inlet side of the projecting surfaces and the shaft, and the shaft is supported by this oil pressure.

For a better understanding of the present invention, reference is made to the following description and accompanying drawings, while the scope of the invention is printed out by the appended claims.

BRIEF DESCRIPTION OF THE DRAWINGS

FIG. 4(A) is a front view and 4(B) a side view;

DETAILED DESCRIPTION OF THE INVENTION

Figure 1:
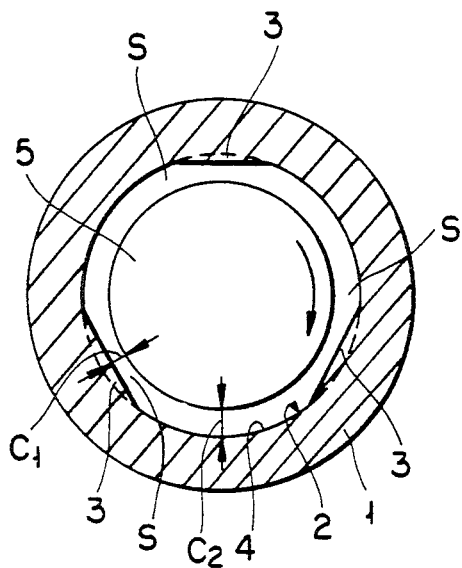
FIG. 1 is a cross sectional view showing one embodiment of an oil impregnated sintered bearing according to the present invention.

The structure of the present invention will be described in detail in connection with embodiments shown in the drawings.

FIG. 1 shows one embodiment of an oil impregnated sintered bearing according to the present invention. This oil impregnated sintered bearing 1 is formed in at least three points or more of a peripheral surface of a longitudinal opening 2 with surfaces 3 projecting toward the inside, that is, toward the side of a shaft 5. With respect to the projecting surface 3, a clearance $C_1$ relative to the shaft 5 is made smaller than a clearance $C_2$ on other inner peripheral surface portions 4, and on the inlet side (this side being in the rotational direction), a wedge-like clearance S is formed relative to the shaft 5. In the case of the present embodiment, the projecting surfaces are formed symmetrically about a normal by a flat planar surface. Therefore, even if the shaft 5 is rotated in either direction, a predetermined desired effect may be obtained.

With respect to the peripheral inner surface portion 4, other than at the projecting surfaces 3, a normal clearance, for example, clearance $C_2$ is set, as a slide bearing, of 15 $\mu$m or less, and preferably, 5 to 10 $\mu$m. With respect to the projecting surfaces 3, clearance $C_1$ is set to 2 to 3 $\mu$m.

In this bearing, when the shaft is stationary, the shaft 5 is supported by three projection surfaces 3, and when the shaft rotates, high oil pressure has to be generated in the projection surfaces 3. Therefore, most preferably, pores in the surface of the projections are filled up so as to substantially eliminate such pores.

Figure 2:
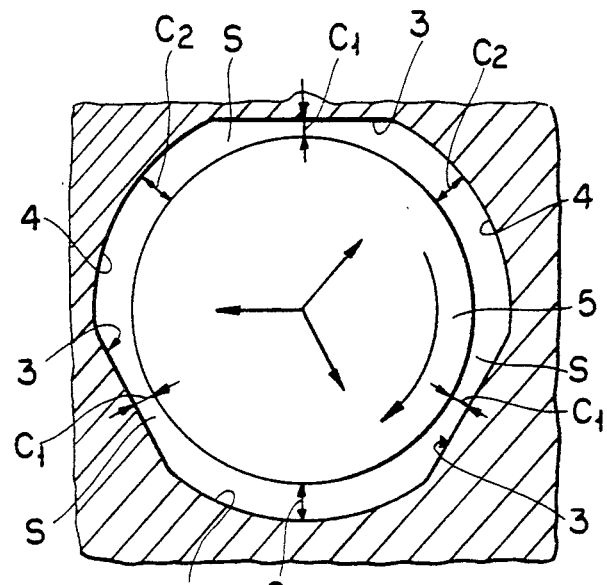
FIG. 2 is an explanatory view showing an oil pressure balance of the bearing shown in FIG. 1.
Figure 3:
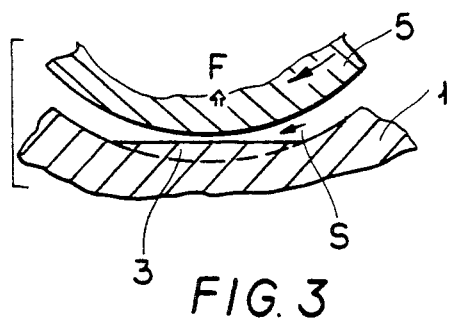
FIG. 3 is an enlarged sectional view of a projecting surface for explaining the function of the projecting surface.

Since the oil impregnated sintered bearing of the present invention is constructed as described above, it is supported under dynamic pressure conditions as shown in FIG. 2.

That is, oil is supplied from the pores in the bearing 1 by rotation of the shaft 5. This oil is gathered at the wedge-like clearances S of the projecting surfaces 3 as the shaft 5 rotates to form a wedge-like oil film. The shaft 5 is floated by oil pressure. Since the wedge-like clearances S and the projecting surfaces 3 are equidistantly arranged in three locations on the circumference, the shaft 5 is rotated while being stably supported, similar to the pressure bearing, by the floating effect of oil pressures $F_1$, $F_2$ and $F_3$ in the projecting surfaces 3.

Figure 4A:
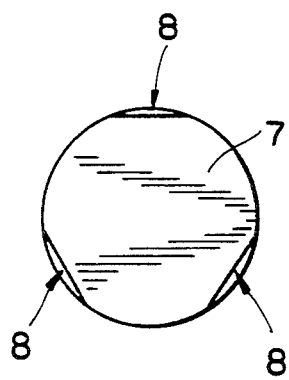
FIGS. 4(A) and 4(B) show one example of a sizing bar.
Figure 4B:
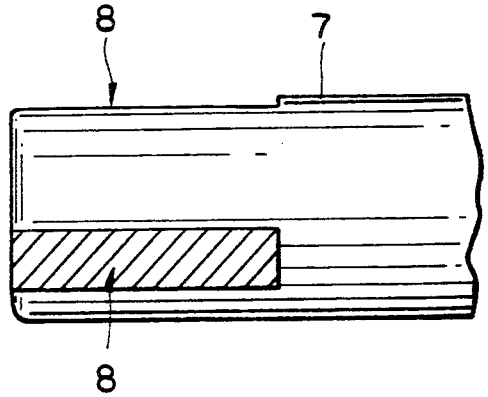

This sintered bearing 1 is obtained by using a special sizing tool 7 during a sizing step, for example, in the conventional production of oil impregnated sintered bearings. A product of the oil impregnated sintered bearing is obtained normally by compounding and measuring a predetermined quantity of composition materials, well mixing it, compression-molding the material into a bearing shape as desired and thereafter sintering it, inserting a sizing bar 7 into an axial hole under pressure to adjust the diameter of the axial hole to a given dimension, immersing it into oil and permeating the same into pores. The resulting bearing which is close to the shape of a final product during molding is sintered, after which the sizing bar 7 as shown in FIGS. 4(A) and 4(B) is inserted to adjust the dimension of the axial hole 2 and, at the same time, form the projection surfaces into the desired shape.

The sizing bar 7 is formed with a face 8 for forming the projecting surfaces 3. Accordingly, the longitudinal opening 2 is enlarged in diameter by the sizing bar 7, and the projection surface 3 is processed by the face 8 into a predetermined shape. At that time, the projection surfaces 3 are made higher than other faces 4 during the molding step, and the surface pores are more filled up than those of the other surfaces 4 to provide a construction in which oil will be hard to penetrate these portions. That is, oil supplied into the bearing during rotation is not subjected to pressure in the projecting surfaces 3 to again penetrate into the bearing. The density of the projecting surfaces 3 is increased because the shaft 5 comes into contact with the projecting surfaces 3 in the stationary state and the loads are concentrated to increase the face pressure so as to withstand it.

Figure 5:
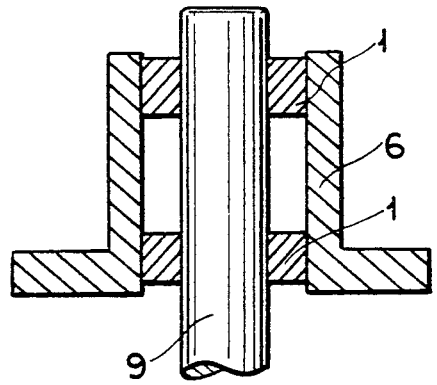
FIG. 5 is an explanatory cross-sectional view showing the assembly of the oil impregnated sintered bearing of the present invention into a housing.

When the oil impregnated sintered bearing 1 formed with the projecting surfaces 3 in the sizing step as previously mentioned is inserted into the housing 6 under pressure, the projecting surfaces 3 may be further machined to fill up the pores in the surfaces of the projecting surfaces 3. For example, as shown in FIG. 5, when the bearing 1 is inserted into the housing 6 using a broach 9, the actual surface of the projecting surface 3 is crushed by the broach 9 so as to substantially remove the pores. The broach 9 is a tool used to register axes when the bearing 1 is assembled into the housing 6. This tool is used for crushing the surface pores, and improving the coaxial degree of the inside diameter of the bearing and the cylindrical degree thereof.

Alternatively, the method of producing the oil impregnated sintered bearing comprises conventional steps up to the step of sizing. The crushing amount is increased by the final broach, and the projecting surface 3 may be formed merely by the broaching.

While the aforementioned embodiment is a mere example of the preferred embodiment of the present invention, it is to be noted that the present invention is not limited thereto but various modifications may be made within the scope not departing from the subject matter of the present invention. For example, the projecting surface 3 is not limited to a projection formed from a flat surface but a circle (curved surface) projected inwardly or a triangle, a trapezoid, etc. as shown in FIGS. 6(C) and 6(D) may be employed. In the case of the wedge-like projecting surface 3 is represented by a triangle as shown in FIG. 6(D), if an angle is too acute, an oil film is not sometimes formed, and a gentle change is preferred. In the case of the projection surface 3 which is symmetrical and gently circular as shown in FIG. 6(C), it can be used for either normal or reverse rotation without any limitation in rotational direction.

Figure 6A:
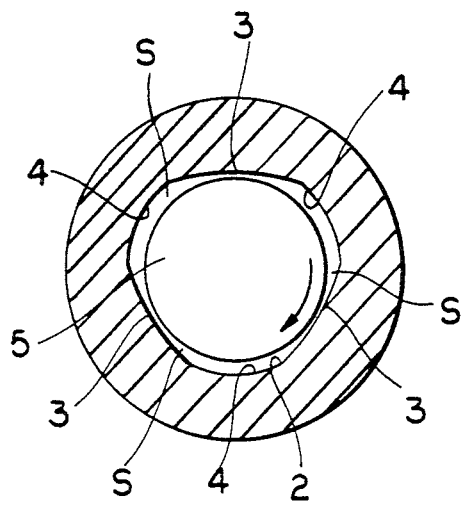
FIGS. 6(A) and (B) are respectively cross sectional views showing another embodiment of the present invention.
Figure 6B:
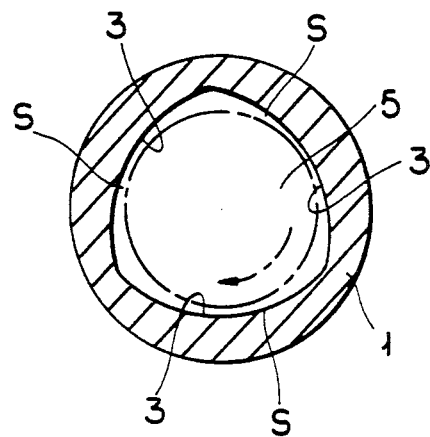
FIGS. 6(C) and (D) are respectively explanatory views showing another form of a projection surface.
Figure 6C:
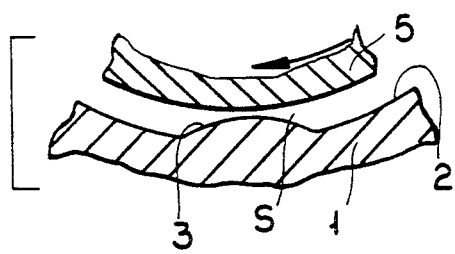
Figure 6D:
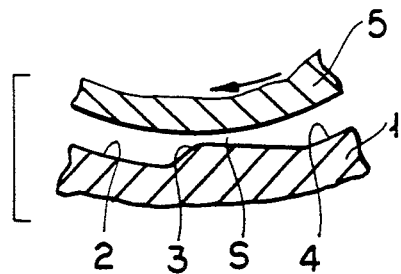

A polygonal bearing as shown in FIGS. 6(A) and (B) can be used whose inner peripheral surface comprises at least three arcs.

As will be apparent from the foregoing, in an oil impregnated sintered bearing according to the present invention, three or more projecting surfaces 3 which project inwardly and having a clearance relative to a shaft made smaller than other portions and forming a wedge-like clearance relative to the shaft are disposed at equiangles (i.e., symmetrical to a central longitudinal axis through the opening), and a wedge-like oil film is formed by oil gathered at the projections during the rotation of the shaft. Therefore, the shaft is supported at three or more locations similar to a dynamic pressure bearing and it rotates in a stable manner involving no vibration. Such bearing is therefore suited for a spindle motor.

Moreover, the bearing of the present invention can be simply manufactured merely by devising the shape of the sizing bar in the sizing step, in the manufacturing step of a conventional oil impregnated bearing, and the bearing can be produced at less cost than conventional dynamic pressure bearing. Furthermore, the bearing of the present invention has the general function of a dynamic pressure bearing. However, since the bearing body comprises an oil impregnated bearing, a supply of oil and seal during use are not necessary, and no burn occurs.

While the foregoing description and drawings represent the preferred embodiments of the present invention, it will be obvious to those skilled in the art that various changes and modifications may be made therein without departing from the true spirit and scope of the present invention.

What is claimed is:

1. In a motor having a bearing support assembly for a rotary shaft of the motor, said support assembly having a housing with an upper oil-impregnated sintered bearing and a lower oil-impregnated sintered bearing, said upper and lower bearings and said motor being made by a new method of compounding and measuring a predetermined quantity of composition materials, well mixing said quantity, compression molding the material in a bearing shape, sintering the molded bearing, inserting a sizing bar into an axial hole under pressure, immersing it in oil and permitting the oil to permeate into pores, the improvement comprising the steps of sizing the bearing by utilizing a sizing bar having faces for providing projections having projecting surfaces on an inner portion of the bearing and inserting the sized bearing into said housing using a broach and filling up the pores of the projecting surfaces, by having the broach crush the projecting surfaces, to a greater amount than the pores of the remaining inner portion so that oil for penetrating the bearing will hardly penetrate the projecting surfaces.

2. An oil impregnated sintered bearing produced by an improved method for manufacturing said bearing by compounding and measuring a predetermined quantity of composition materials, well mixing said quantity, compression molding the material in a bearing shape, sintering the molded bearing, inserting a sizing bar into an axial hole under pressure, immersing it in oil and permitting the oil to permeate into pores, the improvement comprising the steps of sizing t he bearing by utilizing a sizing bar having faces for providing projections having projecting surfaces on an inner portion of the bearing and inserting the sized bearing into a housing using a broach and filling up the pores of the projecting surfaces, by having the broach crush the projecting surfaces, to a greater amount than the pores of the remaining inner portion so that oil for penetrating the bearing will hardly penetrate the projecting surfaces.

3. In a method for manufacturing an oil impregnated sintered bearing by compounding and measuring a predetermined quantity of composition materials, well mixing said quantity, compression molding the material into a bearing shape, sintering the molded bearing, inserting a sizing bar into an axial hole under pressure, immersing it in oil and permitting the oil to permeate into pores, the improvement comprising the steps of:
sizing the bearing by utilizing a sizing bar having faces for providing projections having projecting surfaces on an inner portion of the bearing; and
inserting the sized bearing into a housing using a broach and filling up the pores of the projecting surfaces, by having the broach crush the projecting surfaces, to a greater amount than the pores of the remaining inner portion so that oil for penetrating the bearing will hardly penetrate said projecting surfaces.

* * * * *